United States Patent
Boucek

[19]

[11] Patent Number: 6,061,948
[45] Date of Patent: May 16, 2000

[54] ADAPTABLY MOUNTABLE HEAD WITH EYES FOR ATTACHMENT TO FISHING LURES

[76] Inventor: Kenneth Paul Boucek, 5302 E. Doubletree Rd., Paradise Valley, Ariz. 85253

[21] Appl. No.: 09/121,415

[22] Filed: Jul. 23, 1998

[51] Int. Cl.[7] .................................................. A01K 85/00
[52] U.S. Cl. ...................... 43/42.09; 43/42.36; 43/42.39; 43/42.53
[58] Field of Search .................. 43/42.05, 42.08, 43/42.09, 42.31, 42.36, 42.37, 42.38, 44.2, 44.4, 44.6, 44.8, 42.53, 42.41, 42.25, 42.1, 43.4, 37, 42.39

[56] References Cited

U.S. PATENT DOCUMENTS

| | | | |
|---|---|---|---|
| 994,927 | 6/1911 | Jefferson | 43/42.36 |
| 1,454,820 | 5/1923 | Readle | 43/42.05 |
| 1,486,028 | 3/1924 | Meighen | 43/37 |
| 1,688,110 | 10/1928 | Bogart | 43/42.05 |
| 1,814,450 | 7/1931 | Nelson | 43/44.2 |
| 2,152,971 | 4/1939 | Parkins | 43/42.25 |
| 2,316,048 | 4/1943 | Clarke | 43/44.2 |
| 2,365,502 | 12/1944 | Weesner | 43/42.53 |
| 2,461,755 | 2/1949 | Miller | 43/44.8 |
| 2,518,593 | 8/1950 | Bell | 43/44.2 |
| 2,573,592 | 10/1951 | Nickel | 43/42.09 |
| 2,665,515 | 1/1954 | Frantello | 43/42.33 |
| 2,763,086 | 9/1956 | Johnson et al. | 43/44.2 |
| 2,793,459 | 5/1957 | Multanen | 43/42.41 |
| 2,848,836 | 8/1958 | Dodd | 43/44.6 |
| 2,931,123 | 4/1960 | Jensen, Jr. | 43/42.05 |
| 2,994,982 | 8/1961 | Murawski | 43/35 |
| 3,040,467 | 6/1962 | Norton | 43/44.6 |
| 3,108,390 | 10/1963 | Knight | 43/42.09 |
| 3,418,745 | 12/1968 | Loos | 43/42.09 |

(List continued on next page.)

FOREIGN PATENT DOCUMENTS

| | | | |
|---|---|---|---|
| 43454 | 3/1917 | Sweden | 43/44.2 |
| 468605 | 7/1937 | United Kingdom | 43/44.2 |
| 906089 | 9/1962 | United Kingdom | 43/42.09 |

OTHER PUBLICATIONS

Cone Heads advertisement, Spring, 1998,Cabelas Outdoor Outfitters mail order catalogue.

Real Eyes™ System™ advertisement, Spring, 1998,Cabelas Outdoor Outfitters mail order catalogue.

*Primary Examiner*—Michael J. Carone
*Assistant Examiner*—Darren W. Ark
*Attorney, Agent, or Firm*—Steven Lin; Felsman, Bradley, Vaden, Gunter & Dillon, LLP

[57] ABSTRACT

An adaptably mountable head 30 or 40 that is adapted to be fitted or coupled to a presently existing or common fishing lure, such as a worm and hook fishing lure 10 or a fly fishing lure 20. The adaptably mountable head 30 or 40 respectively comprises a head portion 35 or 45 having a hollow receiving chamber 33 or 43 and attaching components 32 or 42 coupled thereto. The attaching components 32 or 42 are depressed or bent inwardly into the receiving chamber 33 so that they are in engaging positions. Various colored eyes 31 or 41 are painted on or fixedly attached to different head portions 35 or 45 to resemble the heads and eyes of bait animals upon which fish prefer to prey. The attaching components 32 or 42 aid in securing the head portion 35 or 45 to a fishing lure and further aid in securing the body portion of a soft plastic animal fishing lure in place to a fishing hook, thus preventing the body portion from sliding down the shank of the hook. An eyelet access opening 34 or 44 is provided on the head portion 35 or 45 to allow access to the eyelet 11 or 21 of a fishing lure hook 12 or 22 so that a fishing line 5 is able to be attached thereto. The adaptably mountable head 30 or 40 allows a fishing person or angler to easily alter the appearance and attractiveness of a presently existing or common fishing lure by simply interchanging the adaptably mountable head 30 or 40 so that the lure has a different head and eye color combination. A weight portion 39 or 50 is coupled to the head portion 35.

17 Claims, 6 Drawing Sheets

U.S. PATENT DOCUMENTS

| | | | |
|---|---|---|---|
| 3,495,350 | 2/1970 | Lievense | 43/42.25 |
| 3,645,031 | 2/1972 | Egles | 43/44.2 |
| 3,760,526 | 9/1973 | Hicks | 43/44.4 |
| 3,760,529 | 9/1973 | Hicks | 43/44.4 |
| 3,854,233 | 12/1974 | Browning, III | 43/42.08 |
| 3,867,781 | 2/1975 | Wolfe | 43/42.09 |
| 3,877,168 | 4/1975 | Stevens | 43/42.31 |
| 3,890,735 | 6/1975 | Serrill | 43/37 |
| 3,893,255 | 7/1975 | Hicks | 43/44.4 |
| 3,908,298 | 9/1975 | Strader | 43/42.31 |
| 3,914,895 | 10/1975 | Mize | 43/42.05 |
| 3,986,291 | 10/1976 | Hopper | 43/42.09 |
| 4,054,004 | 10/1977 | Schott | 43/42.09 |
| 4,067,135 | 1/1978 | Martin | 43/44.2 |
| 4,133,132 | 1/1979 | Ellis et al. | 43/44.4 |
| 4,163,337 | 8/1979 | Kress | 43/42.05 |
| 4,233,771 | 11/1980 | Robinson | 43/44.4 |
| 4,248,003 | 2/1981 | Thesz | 43/44.8 |
| 4,335,495 | 6/1982 | Buchanan | 43/42.53 |
| 4,785,569 | 11/1988 | Thomas, Jr. | 43/42.31 |
| 4,831,768 | 5/1989 | Sorace | 43/42.09 |
| 4,848,023 | 7/1989 | Ryder et al. | 43/44.2 |
| 4,907,364 | 3/1990 | Hedman | 43/44.8 |
| 4,910,907 | 3/1990 | Schlaegel | 43/44.6 |
| 4,914,851 | 4/1990 | Acker | 43/42.05 |
| 4,932,154 | 6/1990 | Andreetti | 43/44.6 |
| 4,942,689 | 7/1990 | Link et al. | 43/42.36 |
| 4,976,061 | 12/1990 | Pool | 43/44.6 |
| 5,070,639 | 12/1991 | Pippert | 43/42.31 |
| 5,090,151 | 2/1992 | Salminen | 43/42.05 |
| 5,113,607 | 5/1992 | Pate | 43/42.36 |
| 5,119,581 | 6/1992 | Rudolph | 43/42.22 |
| 5,172,510 | 12/1992 | Lovell, Jr. | 43/42.36 |
| 5,177,895 | 1/1993 | Baron | 43/44.2 |
| 5,182,876 | 2/1993 | Lewis | 43/42.39 |
| 5,209,007 | 5/1993 | Southerland, Jr. | 43/42.09 |
| 5,331,762 | 7/1994 | Banks | 43/42.09 |
| 5,335,441 | 8/1994 | Blackwell | 43/42.36 |
| 5,349,776 | 9/1994 | Lucas | 43/42.37 |
| 5,377,442 | 1/1995 | Gariglio | 43/44.4 |
| 5,490,345 | 2/1996 | Infinger | 43/42.36 |
| 5,505,016 | 4/1996 | Baron | 43/44.2 |
| 5,533,296 | 7/1996 | Jansen | 43/42.36 |
| 5,588,246 | 12/1996 | Hill | 43/42.06 |
| 5,829,186 | 11/1998 | Schultz et al. | 43/44.6 |
| 5,953,850 | 9/1999 | Hnizdor | 43/42.25 |

ADAPTABLY MOUNTABLE HEAD WITH EYES FOR ATTACHMENT TO FISHING LURES

FIELD OF INVENTION

The present invention relates to fishing lures, and in particular, to an adaptably mountable head for attachment to presently existing fishing lures.

BACKGROUND OF INVENTION AND BRIEF DESCRIPTION OF THE PRIOR ART

Fishing lures are generally constructed or made to look like living animals such as flies, insects, worms, or other organisms upon which fish prefer to prey. It is known that certain fish are attracted to particular features or colors that a bait animal or a fishing lure may exhibit, depending on the type of fish, water composition, temperature, and other conditions or environmental factors. Therefore, it is difficult for a fishing person or angler to know exactly which fishing lure will attract the most fish on any given day or location or to know which is the best fishing lure that will attract which type of fish. Fishing persons or anglers generally carry a large assortment of fishing lures and use them in a trial-and-error manner to determine which lure is the most attractive to each type of fish.

It is also known that fish are very attracted to eyes of various animals or insects because they associate and identify different living organisms based on the appearance of the eyes. It is further known to fishing persons or anglers that certain fish are more attracted to particular eye and head color combinations. Therefore, fishing lures are often constructed or made to show the appearance of having a head and eyes of various attractive colors.

Figure 1:
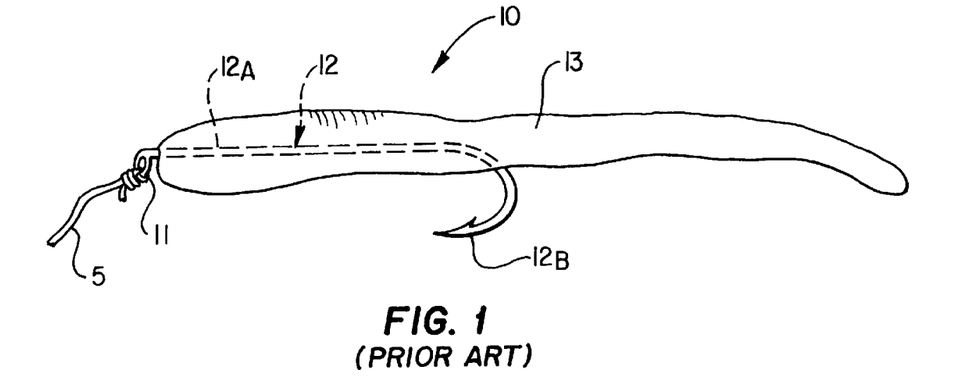
FIG. 1 is a perspective view of a conventional prior art soft plastic worm and hook fishing lure.
Figure 2:
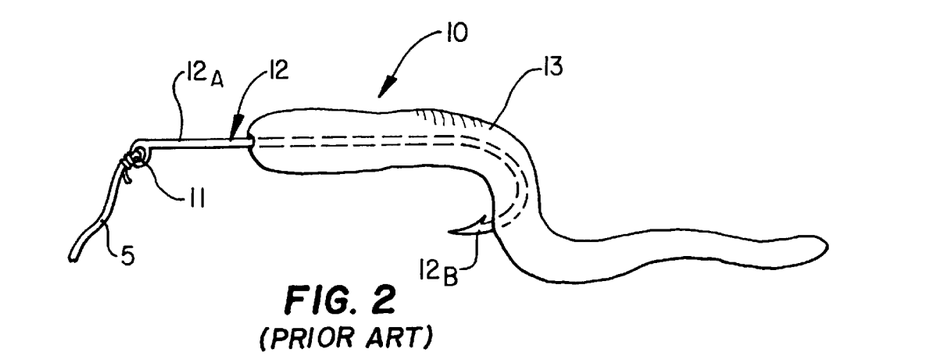
FIG. 2 is a perspective view of the prior art fishing lure of FIG. 1 showing the soft plastic worm portion in a displaced position from the hook.
Figure 3:
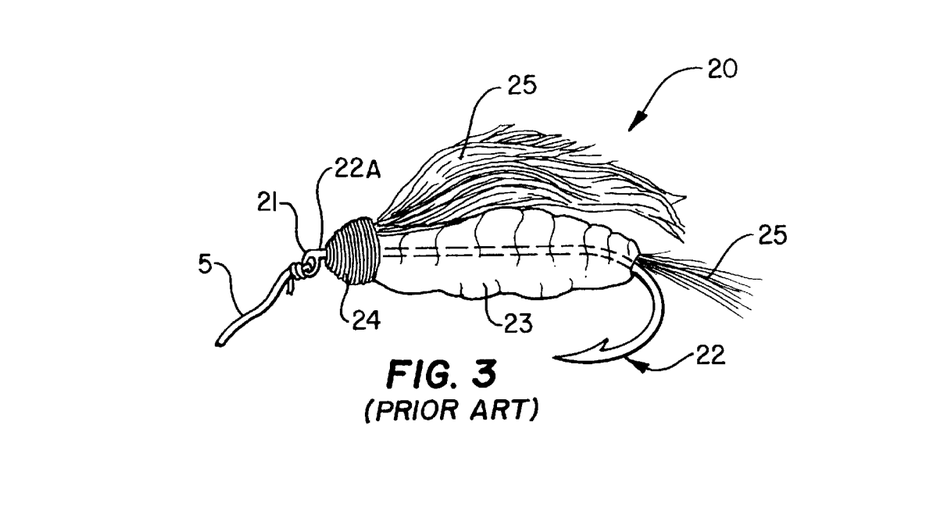
FIG. 3 is a perspective view of a conventional prior art fly fishing lure.

One problem, however, that exists with many common fishing lures (i.e. simulated worm lures and tied fly lures as shown in FIGS. 1 to 3) is that they do not have a distinct head or eyes. Baits that have head and/or eye features have therefore been developed and exist in the prior art. A problem associated with fishing lures that have a distinct head and eyes is that the head and eyes are generally permanent because they are painted on or fastened via adhesive or other fastening devices to the fishing lure. Therefore, they do not allow the appearance of the lure (i.e. color of head or eyes) to be easily altered, changed, or interchanged at the fishing site. Furthermore, some of these prior art baits are manufactured so that the head and/or eye features attach to and are typically only interchangeable to specially manufactured bait body portions and are not able to attach to presently existing or conventional baits or lures. U.S. Pat. Nos. 5,182,876 and 5,331,762 disclose examples of such specially manufactured prior art baits or lures with interchangeable heads. These prior art patents are incorporated by reference herein.

Further attempts have been made to provide removably mounted eyes for baits and lures. However, some of these prior art removably mounted eyes are, at times, cumbersome and difficult to attach to the lure, and some are not even mountable at all to some types of lures (i.e. a fly lure as shown in FIG. 3). Furthermore, if these removably mounted eyes fall off or detach from the lure during use, then they will be lost.

Examples of common prior art lures are shown in FIGS. 1–3. FIGS. 1 and 2 show a conventional prior art worm and hook lure 10. The lure 10 comprises a soft plastic worm 13 wherein a portion of the worm 13 is threaded through and mounted to a hook portion 12. A fishing line 5 is attached to the eyelet 11 of the hook 12. FIG. 2 shows a common problem with these lures 10 that is, the simulated worm/animal portion 12 of the lure 10 may slide down the shank 12A of the hook 12 while the lure 10 is being used. When this sliding of the worm 12 occurs, the physical characteristics of the lure are altered, and the lure may obstruct the barbed end 12B of the hook 12. Eyes/retaining devices for baits that help retain the body (i.e. soft body) of the bait to a hook have been developed and exist in the prior art. U.S. Pat. No. 4,785,569 to Thomas, Jr. discloses an example of such eyes/retaining device. This prior art patent is incorporated by reference herein. However, these eyes/retaining devices are difficult to use since the eyes/retaining devices need to be inserted through the bait body and also insertingly aligned through the eyelet of the hook.

FIG. 3 shows a prior art fly lure 20 (i.e. tied fly lure type). The fly lure 20 comprises a fly body portion 23 that is tied or wrapped tightly around the shank 22A of a hook 22, and various attractive features 25 further provide the fly lure 20 with the appearance or look of a real insect. The head portion 24 is generally made by wrapping heavy thread around the shank 22A of the hook 22 until a desired thickness is obtained. The thread is then cemented or bonded together. Fishing line 5 is shown attached to the eyelet 21 of the hook 22. However, these prior art fly lures 20 do not provide a surface area which allows for easy mounting or interchanging of head and/or eyes features for the lure or bait.

Therefore, the need exits for an adaptably mountable head that allows for a variety of head and eye color combinations and are easily adapted to attach and couple to and are interchangeable between and released/removed from a variety of presently existing or common fishing lures. Furthermore, a device/head for a lure that prevents a body portion of a lure from sliding down the shank of a hook is also needed and desired.

SUMMARY OF INVENTION

Set forth is a brief summary of the invention in order to solve the foregoing problems and achieve the foregoing and other objects, benefits, and advantages in accordance with the purposes of the present invention as embodied and broadly described herein.

It is an object of the invention to provide head and/or eye features for a fishing lure.

It is another object of the invention to provide a variety of head and/or eye features for a fishing lure that are easily adapted to attach/couple to and are interchangeable between and released/removed from a variety of presently existing or common fishing lures.

It is a further object of the invention to provide an adaptably mountable device to a presently existing or common fishing lure to provide the fishing lure with a more lively animal/organism appearance upon which fish would prefer to prey.

It is still another object of the invention to provide an adaptably mountable device that provides head and/or eyes to the fishing lure to which fish are particularly attracted.

It is still a further object of the invention to provide an adaptably mountable device that helps reduce the number of fishing lures that a fishing person or angler may have to carry or bring on a fishing expedition.

It is another object of the invention to provide an adaptably mountable device that is interchangeably and releasably mounted between presently existing or common fishing lures to allow a fishing person or angler to easily alter or change the appearance and various attractive color features of the fishing lure to ones which certain fish are more attracted.

It is a further object of the invention to provide a device/head for a fishing lure that helps maintain a body portion of the lure in place and prevents the body portion from sliding down the shank of the fishing lure hook.

It is still a further object of the invention to provide a device/head that is readily mountable to and removable from a fishing lure and that is easily mounted to and removed from a fishing lure at a fishing site.

It is still another object of the invention to provide a device/head that is mountable to a fishing lure which is easy and cost effective to manufacture and use.

It is another object of the invention to provide a device/head that will remain coupled to a fishing line in the event that the device/head falls off or detaches from the lure during use so that the device/head will not be lost.

It is another object of the invention to provide an adaptably mountable head that provides weight or allows weight(s) to be coupled therein.

The above and other objects are achieved by an adaptably mountable head for a fishing lure that includes a head portion having a hollow receiving chamber with a chamber opening. The chamber receivingly couples to and the head portion fittingly secures over at least a portion of the fishing lure. The adaptably mountable head further has at least one eye component (i.e. preferably two eye components) coupled to the head portion. The head portion is configured to be an animal or bait head. The head portion has an eyelet access opening. An eyelet of a fishing hook that is part of the fishing lure is able to be generally located at the eyelet access opening, and the eyelet access opening allows a fishing line to be able to attach to the eyelet. The adaptably mountable head also has attaching components (i.e. projections or barbed pieces) coupled to the head portion wherein the attaching components further secure the head portion to the fishing lure. A fishing line is threaded through the eyelet access opening of the head portion and the weight portion is coupled to the fishing line. Alternatively, a weight portion is made integrally part of the head portion of the adaptably mountable head.

The above and other objects are also achieved by a method of making an adaptably mountable head for a fishing lure. A head portion having a hollow receiving chamber with a chamber opening is provided. The chamber receivingly couples to and the head portion fittingly secures over at least a portion of the fishing lure. At least one eye component is coupled to the head portion. An eyelet access opening is provided on the head portion. An eyelet of a fishing hook that is part of the fishing lure is able to be generally located at the eyelet access opening, and the eyelet access opening allows a fishing line to be able to attach to the eyelet. Attaching components are coupled to the head portion so that the attaching components further secure the head portion to the fishing lure.

The above and other objects are also achieved by a method of using an adaptably mountable head for fishing lures. The adaptably mountable head is provided with a head portion that has a hollow receiving chamber and a chamber opening. The chamber receivingly couples to and the head portion fittingly secures over at least one portion of the fishing lure. The adaptably head portion is slidingly coupled over the at least one portion of the fishing lure. The head portion of the fishing lure is received through the chamber opening and into the receiving chamber.

The preferred embodiments of the inventions are described below in the Figures and Detailed Description. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Detailed Description is not intended to indicate a desire to invoke the special provisions of 35 U.S.C. Section 112, paragraph 6 to define the invention. To the contrary, if the provisions of 35 U.S.C. Section 112, paragraph 6, are sought to be invoked to define the inventions, the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. Section 112, paragraph 6. Moreover, even if the provisions of 35 U.S.C. Section 112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DETAILED DESCRIPTION

The present invention discloses an adaptably mountable head 30 or 40 that is able to be coupled to and interchanged between presently existing or common fishing lures, such as soft plastic worm and hook fishing lures 10 (i.e. see FIG. 1) or fly fishing lures 20 (i.e. see FIG. 3). The present invention allows a fishing person or angler to alter, enhance, or interchange the appearance (i.e. add or vary color combinations of head and eyes) of presently existing or common fishing lures, thus making them more attractive to fish and lured to desired types of fish. Also, the present invention discloses a method to secure and prevent soft plastic worms 13 and other soft plastic simulated animals, baits, or lures from sliding down the shank 12A of a hook 12 (i.e. see problem shown in FIG. 2).

FIGS. 4 through 8 disclose a first embodiment of the present invention. This first embodiment adaptably mountable head 30 comprises a head portion 35 having an eyelet access opening 34 that permits a fishing line 5 to be attached to the eyelet 11 or 21 of the hook 12 or 22 of a fishing lure 10 or 20. The head portion 35 may be configured as an animal head or bait head. The head portion 35 has a receiving chamber 33 and a chamber opening 36. The leading end of a presently existing fishing lure, such as a worm and hook lure 10 or a fly lure 20, is passed through the chamber opening 36 and into the receiving chamber 33, and the head portion 35 slides over, couples to, and fittingly secures over at least a portion of the fishing lure. Attaching components 32 are located at or near a perimeter of the chamber opening 36. The figures show that the attaching components 32 are projections or barbed pieces that are able to releasably engage to the fishing lure so that the head portion 35 stays secure to the fishing lure. Attaching components 32 also help prevent the head portion 35 from rotating or becoming disengaged from the fishing lure while in use. The attaching components 32 allow the head portion 35 to be releasable from the fishing lure by a fishing person or angler if so desired. A pair of desired colored eyes 31 (such as brightly colored, simulated eyes) are attached/coupled to or painted on the head portion 35 to provide the fishing lure with a more lively animal appearance when the adaptably mountable head 30 is coupled to the fishing lure.

Figures 4, 5, 6:
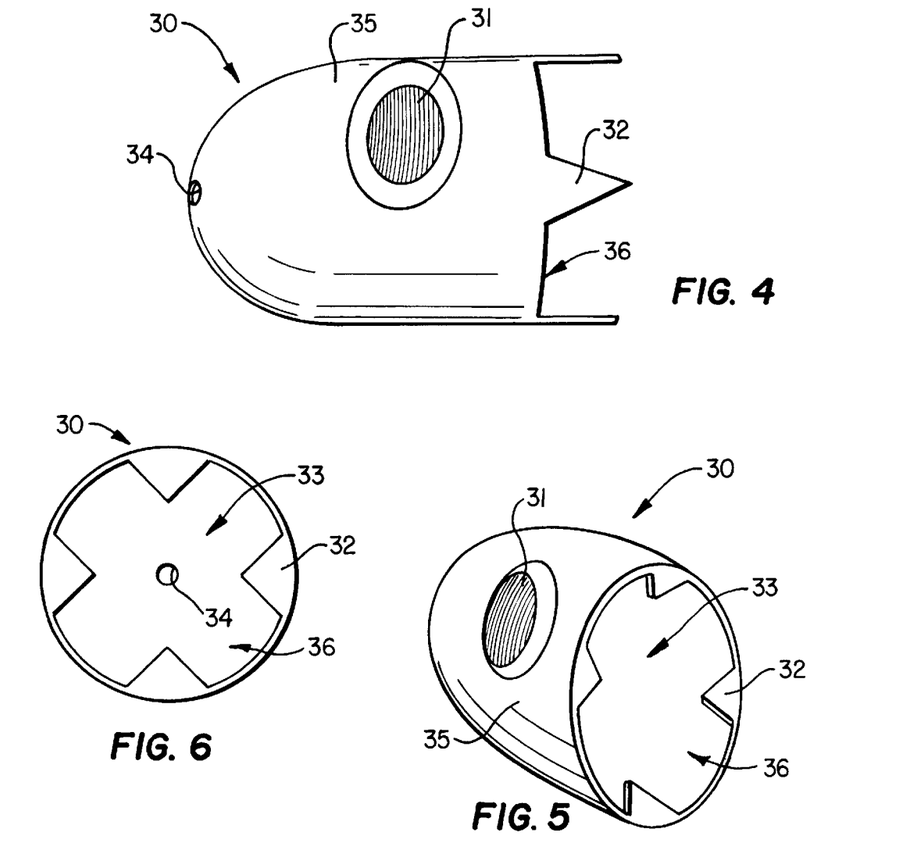
FIG. 4 is a perspective view of a first embodiment adaptably mountable head showing the attaching components in an outward position.
FIG. 5 is a rear perspective view of the first embodiment adaptably mountable head of FIG. 4 showing the attaching components in an inward position.
FIG. 6 is a rear view of the first embodiment adaptably mountable head of FIG. 5.
Figure 7:
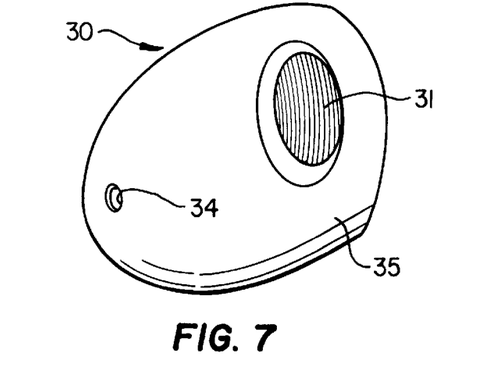
FIG. 7 is a front perspective view of the first embodiment adaptably mountable head of FIG. 5 showing the eyelet access opening at the front of the head portion.
Figure 8:
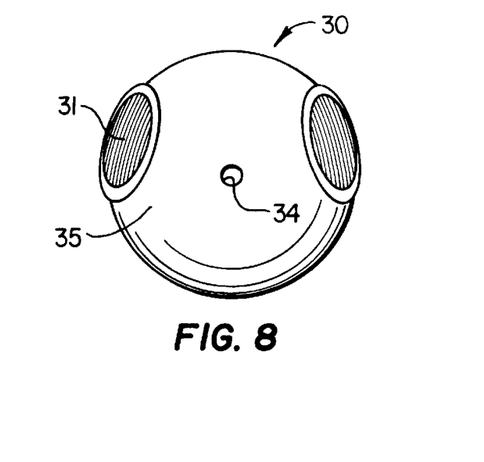
FIG. 8 is a front view of the first embodiment adaptably mountable head of FIG. 5 showing both eyes and the eyelet access opening.

FIG. 4 shows the attaching components 32 in relaxed or outward positions (i.e. disengaged positions). These attaching components 32 would be typically manufactured in this outward position (i.e. since the adaptably mountable heads 30 would typically be plastic injection molded). FIGS. 5 and 6 show that in order to use the adaptably mountable heads 30, the attaching components 32 are depressed or bent inwardly (i.e. either by the manufacturer or by the user) so that they are in engaging positions. The attaching components 32 are subtly angled and/or sufficiently flexible to allow the attachably mountable head 30 to be both readily attached to and removed from the fishing lure 10 or 20.

Figure 9:
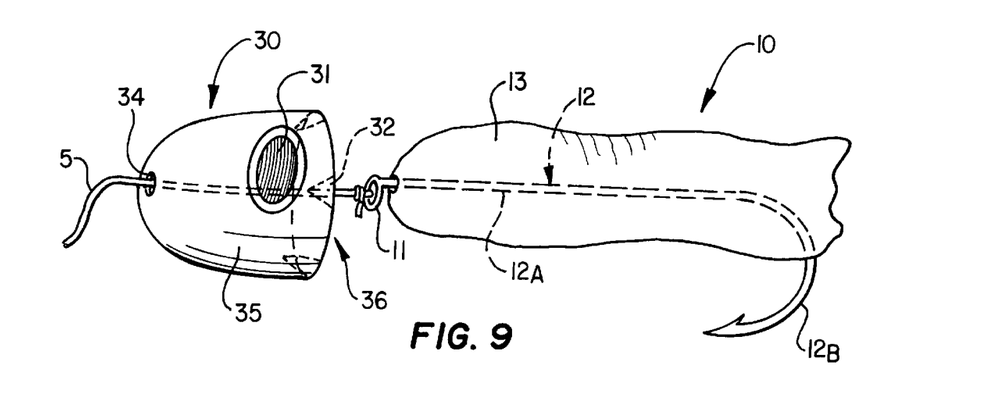
FIG. 9 is a perspective view of the adaptably mountable head of FIGS. 5 to 8 as it is being coupled or fitted to a soft plastic worm and hook fishing lure.
Figure 10:
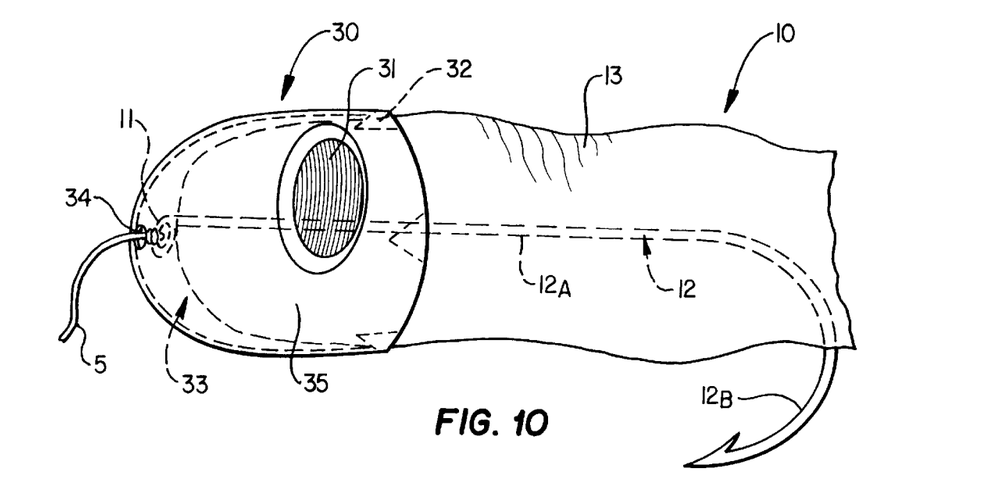
FIG. 10 is a perspective view of the adaptably mountable head of FIG. 9 coupled and engaged to the soft plastic worm and hook fishing lure.
Figure 11:
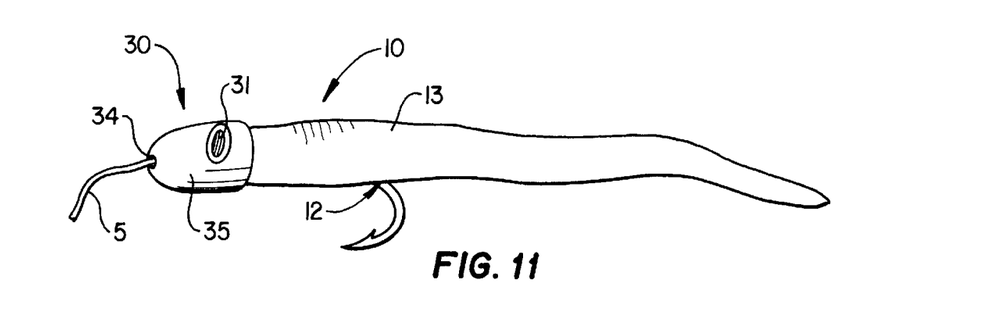
FIG. 11 is another perspective view of the adaptably mountable head of FIG. 10 coupled and engaged to the soft plastic worm and hook fishing lure.

FIGS. 9 through 11 show how the present invention is used or coupled to a soft plastic worm and hook fishing lure 10 or other soft plastic, elastic, or rubber fishing lure. Referring to FIG. 9, the attaching components 32 are depressed or bent inwardly into the receiving chamber 33 by the user so that the attaching components 32 are each at an angled position (i.e. engaging position) as shown in FIGS. 5, 6, and 9. The fishing line 5 is threaded through the eyelet access opening 34 of the head portion 35 and fastened or tied to the eyelet 11 of the hook 12. The chamber opening 36 is aligned with the leading end of the soft plastic worm and hook fishing lure 10, and the head portion 35 is slid over and securingly fitted to the leading end of the lure 10 until at least a body portion of the soft plastic worm 13 fits snugly within the receiving chamber 33 as shown in FIGS. 10 and 11.

The angled attaching components 32 (i.e. projections or barbed pieces) press into the body portion of the soft plastic worm 13, thus further securing the head portion 35 to the fishing lure 10 and preventing the head portion 35 and the lure 10 from becoming disengaged and preventing the head portion 35 from rotating on or about the fishing lure 10 during normal use. Furthermore, referring to FIG. 10, because the eyelet access opening 34 is generally made smaller than the eyelet 11, the eyelet 11 generally remains in an interior portion of the head portion 35 near the eyelet access opening 34. The eyelet 11 is lodged and held between the inner wall of the receiving chamber 33 of head portion 35 and the leading end of the worm body portion 13. The projections or barbed pieces 32 hold the leading end of the worm body portion 13 of the fishing lure 10 in place on the shank 12A of the hook 12 and near the eyelet 11 as shown in FIG. 10, and these respective components are held in place to prevent both the worm body portion 13 and the adaptably mountable head 30 from sliding down the shank of the hook 12. FIG. 11 shows the soft plastic worm and hook fishing lure 10 with the adaptably mountable head 30 coupled thereto as it is intended to be used by a fishing person or angler.

Figure 12:
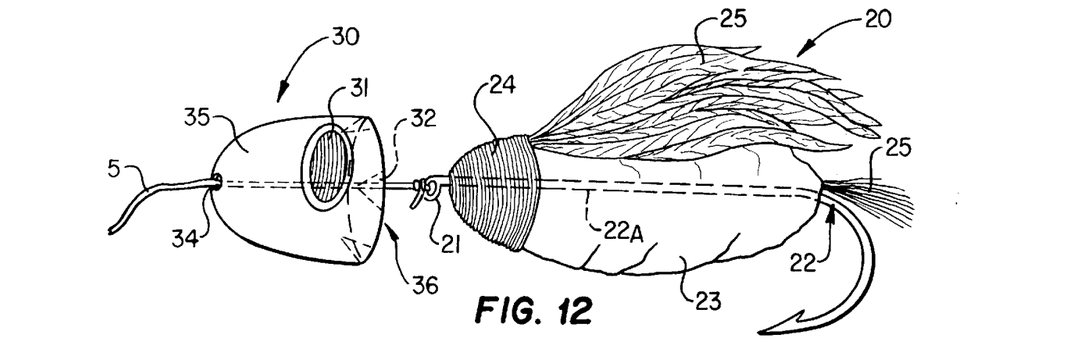
FIG. 12 is a perspective view of the adaptably mountable head of FIGS. 5 to 8 being coupled or fitted to a fly fishing lure.
Figures 13, 14:
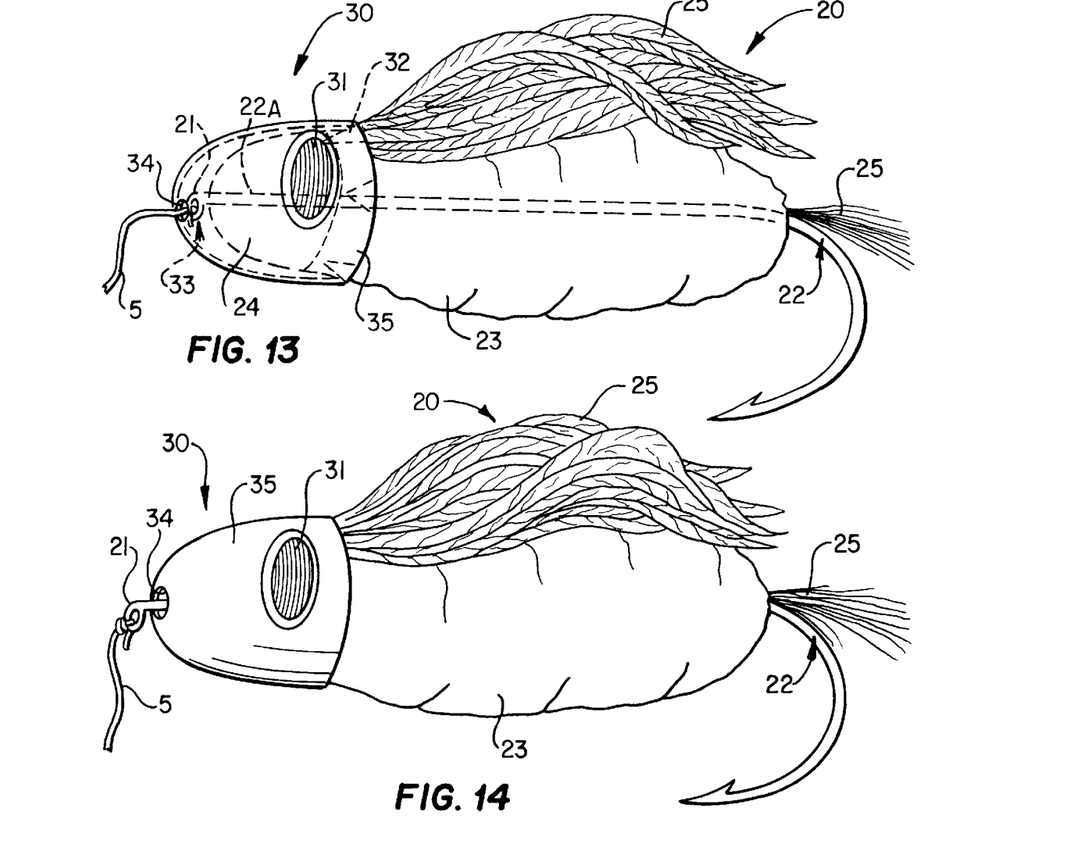
FIG. 13 is a perspective view of the adaptably mountable head of FIG. 12 coupled to a fly fishing lure showing the engagement between the attaching components and the fly lure and further showing the eyelet of the hook in the interior of the receiving chamber of the head.
FIG. 14 is a perspective view of the fly fishing lure with the adaptably mountable head of FIG. 12 coupled thereto in an alternate manner showing the eyelet of the hook protruding through the eyelet access opening.

FIGS. 12 through 14 show how the present invention is used or coupled to a fly fishing lure 20. Referring to FIG. 12, the attaching components 32 are inwardly depressed or bent into the receiving chamber 33 so that they are in engaging positions. The fishing line 5 is threaded through the eyelet access opening 34 and attached or tied to the eyelet 21 of the hook 22. The head portion 35 is slid over and securingly fitted to the fly head 24 and/or at least a portion of the fly body 23 of the fly fishing lure 20. The attaching components 32 secure the head portion 35 to the fly fishing lure 20 as shown in FIG. 13 (i.e. the eyelet 11 generally remains in an interior portion of the head portion 35 near the eyelet access opening 34).

Fly fishing lures 20 generally do not have the same sliding problems (i.e. the body sliding down the shank of the hook as shown in FIG. 2) that occur with soft plastic animal and hook fishing lures 10. Therefore, as an alternative method of mounting the head 30 to the fly fishing lure 20, the head portion 35 is slidingly coupled to the fly head 24 and/or at least portion of the fly body 23 of the fishing lure 20. The eyelet access opening 34 is made large enough to allow the eyelet 21 of the hook 22 to pass through the eyelet access opening 34. After the eyelet 21 is passed through the opening 34 to an exterior portion of the head portion 35, the fishing line 5 is secured or tied to the eyelet 21 as shown in FIG. 14. This alternative method of mounting the head 30 allows the eyelet 21 to be accessible for attachment of the fishing line 5 after the head portion 35 is coupled or attached to the fishing lure 20.

FIGS. 10, 11, 13, and 14 show the adaptably mountable head 30 securely attached to the lure 10 or 20. However, in the event that the head 30 should fall off or detach from the lure 10 or 20, the head 30 still remains coupled to the fishing line 5 (i.e. see FIGS. 9 and 12 which show the head 30 still coupled to the fishing line 5 at the eyelet access opening 34).

Figure 15:
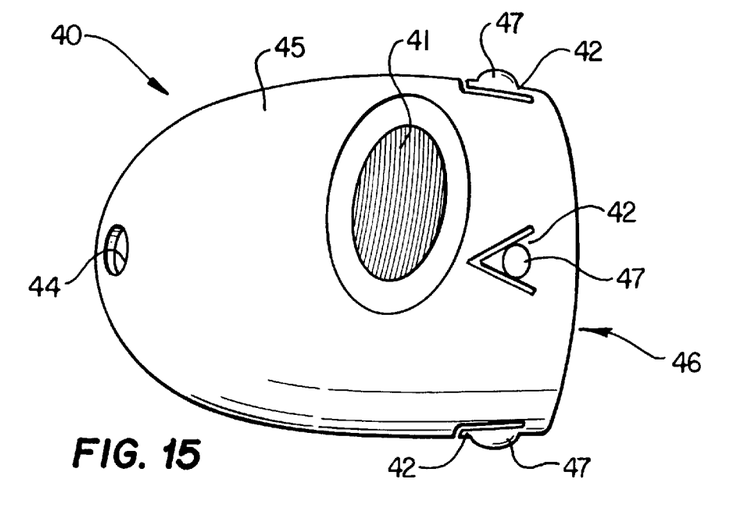
FIG. 15 is a perspective view of a second embodiment adaptably mountable head showing the attaching components in disengaged positions.
Figure 16:
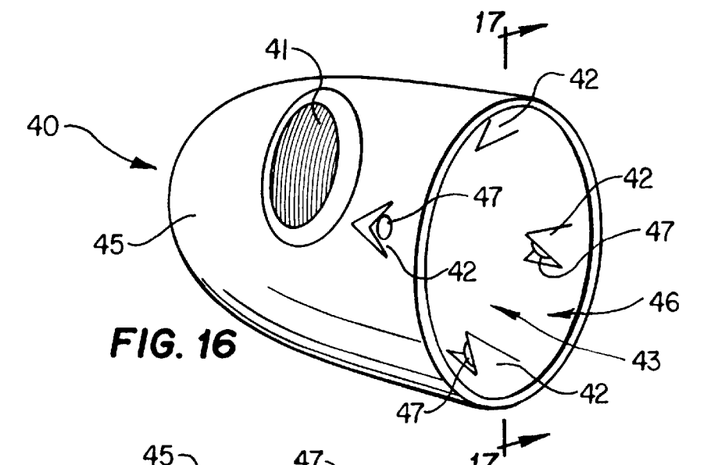
FIG. 16 is a perspective view of the second embodiment adaptably mountable head showing the attaching components depressed or bent inwardly into the receiving chamber so that they are in engaging positions.
Figure 17:
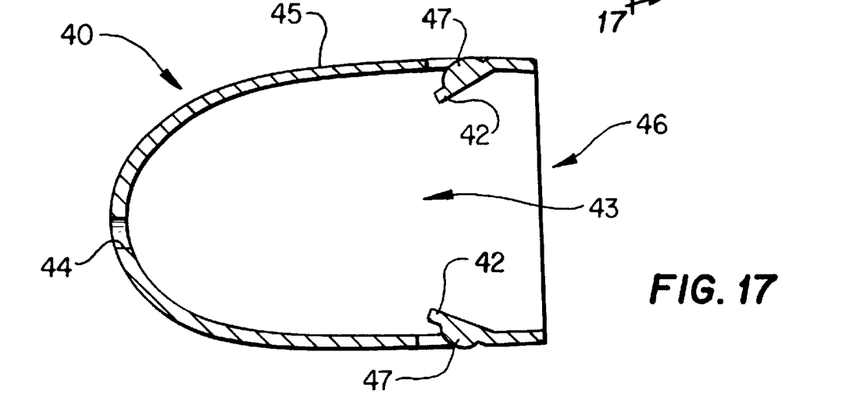
FIG. 17 is a cross-sectional view of the second embodiment adaptably mountable head taken on the line 17—17 of FIG. 16 showing the attaching components depressed or bent inwardly into the receiving chamber.

FIGS. 15 through 17 disclose a second embodiment of the present invention. FIGS. 15 through 17 show an adaptably mountable head 40 having a head portion 45, an eyelet access opening 44, and a receiving chamber 43 with a chamber opening 46. A pair of eyes 41 are located on the head portion 45. Attaching components 42 having protuberances 47 are molded into the head portion 45 as shown in these figures. The attaching components 42 are made from slitted wall portions of the receiving chamber 43. FIG. 15 shows that the attaching components are in disengaged positions. Protuberances 47 allow the attaching components 42 to be easily depressed or bent inwardly as shown in FIGS. 16 and 17. The attaching components 42 only need to be slightly depressed into the receiving chamber 43 of the head portion 45 as shown in FIGS. 16 and 17 so that the attaching components 42 are in engaging positions. The attaching components 42 provide projections or barbed pieces that engage at least a portion of a fishing lure 10 or 20. The attaching components 42 are subtly angled and/or sufficiently flexible to allow the head 40 to be both readily attached to and removed from a fishing lure 10 or 20. Except for the differences between the manners in which the attaching components 42 and 32 respectively attach to the heads 40 and 30, the second embodiment adaptably mountable head 40 is made, used, and mounted/removed in the same manner as described earlier for the first embodiment adaptably mountable head 30.

Figure 18:
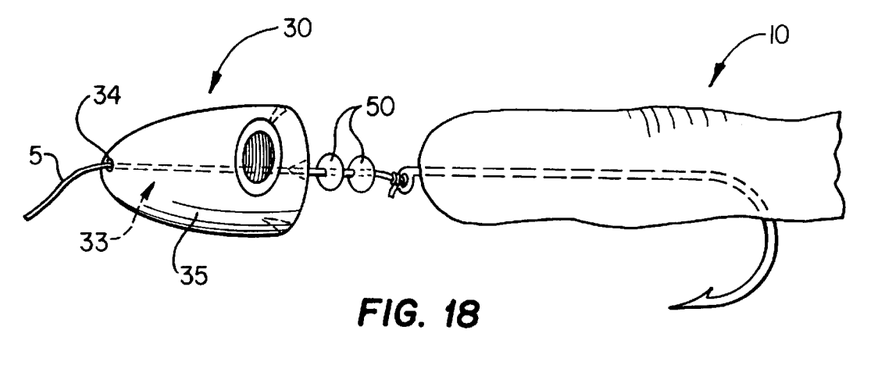
FIG. 18 is a perspective view of the adaptably mountable head of FIG. 9 showing weights coupled to the fishing line.
Figure 19:
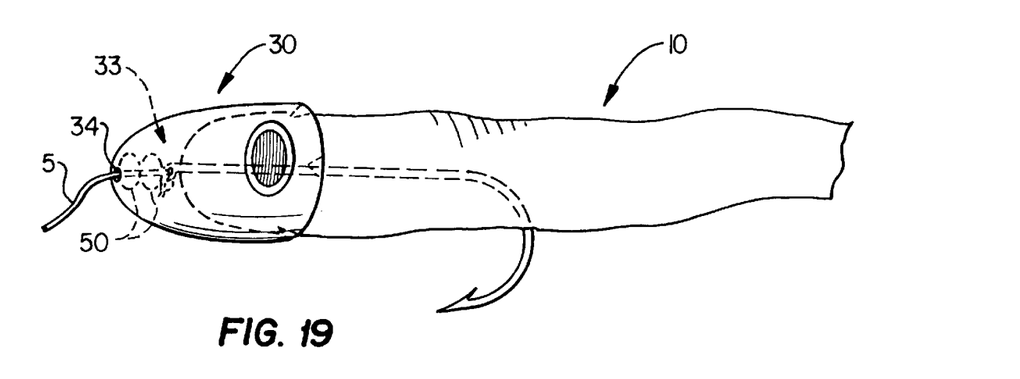
FIG. 19 is a perspective view of the adaptably mountable head of FIG. 10 showing weights retained in the receiving chamber of the head portion.

FIGS. 18 and 19 show the adaptably mountable head 30, having an elongated head portion 35, being coupled to a soft plastic worm and hook fishing lure 10 and weights 50 being coupled within the receiving chamber 33 of the head portion 35. A fishing line 5 is threaded through the eyelet access opening 34, and weights 50 are coupled to the fishing line 5. FIG. 19 shows that when the head portion 35 is coupled to the lure 10, the weights 50 are coupled to the fishing line 5 and retained within the receiving chamber 33. The coupling process is exactly the same as was previously described in the detailed description of FIGS. 9 and 10 except that weights 50 are coupled to the fishing line 5 near the eyelet 11 before the head portion 35 is slid over the lure 10.

Figure 20:
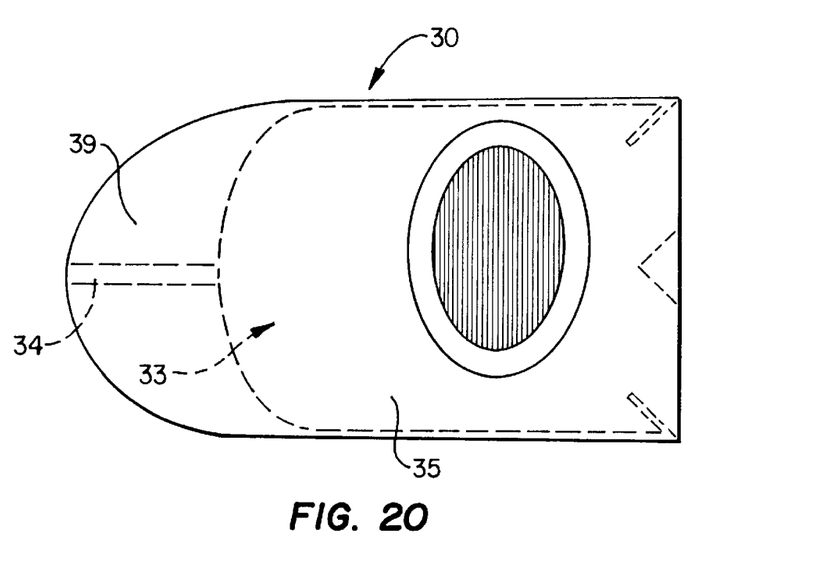
FIG. 20 is a side view of the adaptably mountable head wherein the weight is an integral part of the head portion.

FIG. 20 shows the adaptably mountable head 30 wherein a weight portion 39 is made integrally part of the head portion 35. FIG. 20 further shows that the eyelet access opening 34 extends from the exterior of the head portion 35, through the weight portion 39, and into the receiving chamber 33.

The preferred embodiment of the invention is described above in the Figures and Detailed Description. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to applicant at the time of filing the application has been presented for the purposes of illustration and description. It is not intended to be exhaustive or to limit the invention to the precise form disclosed, and many modifications and variations are possible in the light of the above teaching. The embodiment was chosen and described in order to best explain the principles of the invention and its practical application and to enable others skilled in the art to best utilize the invention in various embodiments and with various modifications as are suited to the particular use contemplated.

What is claimed is:

1. An adaptably mountable head for a fishing lure comprising:

a head portion having a first end, a second end, a longitudinal axis extending between the ends, and a wall portion extending between the ends which defines a hollow receiving chamber with a chamber opening at the second end of the head portion which is defined by an edge of the wall portion, wherein the chamber is receivingly coupleable to and the head portion is fittingly securable over at least a portion of the fishing lure; and attaching components coupled to the head portion for further securing the head portion to the fishing lure, the attaching components being attached to the edge of the wall portion and extending therefrom in a direction which is parallel to the longitudinal axis, and the attaching components being projections which are bendable inwardly into the receiving chamber.

2. The adaptably mountable head according to claim 1 further comprises:

at least one eye component coupled to the head portion.

3. The adaptably mountable head according to claim 2 wherein:

the at least one eye component being two eye components.

4. The adaptably mountable head according to claim 1 wherein:

the head portion is configured to be an animal head.

5. The adaptably mountable head according to claim 4 wherein:

the animal head is a bait head.

6. The adaptably mountable head according to claim 1 wherein the head portion further comprises:

an eyelet access opening wherein an eyelet of a fishing hook that is part of the fishing lure is able to be generally located at the eyelet access opening and wherein the eyelet access opening allows a fishing line to be able to attach to the eyelet.

7. The adaptably mountable head according to claim 6 wherein:

the eyelet access opening is generally smaller than the eyelet so that the eyelet is able to remain within an interior portion of the head portion.

8. The adaptably mountable head according to claim 6 wherein:

the eyelet access opening is generally larger than the eyelet so that the eyelet is able to pass through the eyelet access opening and be located at an exterior portion of the head portion.

9. The adaptably mountable head according to claim 1 further comprising:

a weight portion coupled to the head portion.

10. The adaptably mountable head according to claim 9 wherein:

a fishing line is threaded through the head portion and the weight portion is coupled to the fishing line.

11. The adaptably mountable head according to claim 9 wherein:

the weight portion is made integrally part of the head portion.

12. A method of making an adaptably mountable head for a fishing lure comprising the step of:

providing a head portion having a first end, a second end, a longitudinal axis extending between the ends, and a wall portion extending between the ends which defines a hollow receiving chamber with a chamber opening at the second end of the head portion which is defined by an edge of the wall portion, wherein the chamber receivingly couples to and the head portion fittingly secures over at least a portion of the fishing lure; and coupling attaching components to the head portion for further securing the head portion to the fishing lure, the attaching components being attached to the edge of the wall portion and extending therefrom in a direction which is parallel to the longitudinal axis, and the attaching components being projections which are bendable inwardly into the receiving chamber.

13. The method of making an adaptably mountable head according to claim 12 further comprising the step of:

coupling at least one eye component to the head portion.

14. The method of making an adaptably mountable head according to claim 12 further comprising the step of:

providing an eyelet access opening on the head portion wherein an eyelet of a fishing hook that is part of the fishing lure is able to be generally located at the eyelet access opening and wherein the eyelet access opening allows a fishing line to be able to attach to the eyelet.

15. A method of using an adaptably mountable head for fishing lures comprising the steps of:

providing a fishing lure with a fishing hook having an eyelet;

providing the adaptably mountable head with a head portion having a first end, a second end, a longitudinal axis extending between the ends, a wall portion extending between the ends which defines a hollow receiving chamber and a chamber opening at the second end of the head portion which is defined by an edge of the wall portion, and attaching components being attached to the edge of the wall portion and extending therefrom in a direction which is parallel to the longitudinal axis, and the attaching components being projections which are bendable inwardly into the receiving chamber, wherein the chamber opening receivingly couples to and the head portion fittingly secures over at least one portion of the fishing lure;

slidingly coupling the head portion over the at least one portion of the fishing lure whereby the at least one portion of the fishing lure is received through the chamber opening and into the receiving chamber.

16. The method of using an adaptably mountable head according to claim 15 further comprising the steps of:

providing a fishing line, providing an eyelet access opening on the head portion wherein the eyelet of the fishing hook is able to be generally located at the eyelet access opening and wherein the eyelet access opening allows the fishing line to be able to attach to the eyelet, first threading the fishing line through the eyelet access opening of the head portion, then fastening the fishing line to the eyelet of the fishing hook, and then slidingly coupling the head portion over the at least one portion of the fishing lure whereby the eyelet of the fishing hook is retained generally within the head portion.

17. The method of using an adaptably mountable head according to claim 15 further comprising the steps of:

providing a fishing line, providing an eyelet access opening on the head portion wherein the eyelet of the fishing hook is able to be generally located at the eyelet access opening and wherein the eyelet access opening allows the fishing line to be able to attach to the eyelet, first slidingly coupling the head portion over the at least one portion of the fishing lure, then passing the eyelet through the eyelet access opening to an exterior portion of the head portion, and then fastening the fishing line to the eyelet of the fishing hook of the fishing lure.

* * * * *